M. O. MEEKS.
DIRIGIBLE HEADLIGHT MECHANISM.
APPLICATION FILED OCT. 19, 1917.
1,351,299. Patented Aug. 31, 1920.
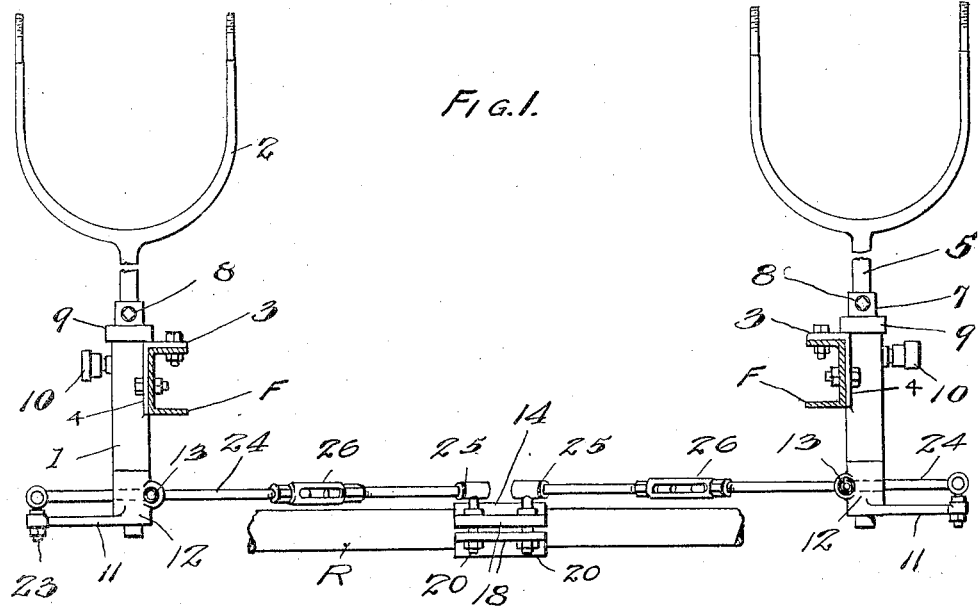
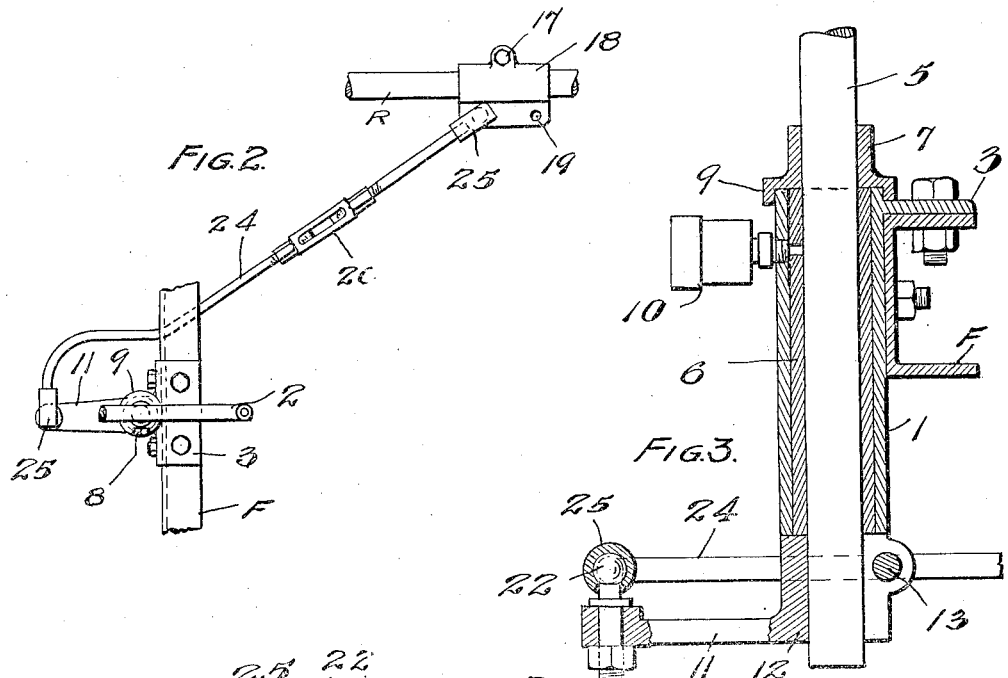

UNITED STATES PATENT OFFICE.

MACK O. MEEKS, OF WILDORADO, TEXAS.

DIRIGIBLE HEADLIGHT MECHANISM.

1,351,299.　　　　　Specification of Letters Patent.　　Patented Aug. 31, 1920.

Application filed October 19, 1917. Serial No. 197,465.

*To all whom it may concern:*

Be it known that I, MACK O. MEEKS, a citizen of the United States, and resident of Wildorado, Texas, have invented certain new and useful Improvements in Dirigible Headlight Mechanism, of which the following is a specification.

The general object of my invention is to improve and simplify structures of this class. More particular objects are to provide various necessary adjustments, which enable the mechanism to be more readily applied to different motor-vehicles, and also enable the angle of the headlights to be readily varied or adjusted; to provide removable bearing members of a single character; to provide for excluding dirt from these bearings; and to provide new and improved pivotal connections for devices of this class.

The accompanying drawing shows one exemplifying structure embodying the foregoing objects; and after considering this embodiment persons skilled in the art will understand that the invention may be embodied in different forms, and I do not limit myself to details of construction, except as claimed hereinafter.

Figure 1 is a front elevation of a structure embodying my invention, sufficient parts of a motor vehicle being shown to explain the mode of attachment of the headlight mechanism thereto.

Fig. 2 is a top plan of (substantially) one-half of the structure.

Fig. 3 is a vertical section through one of the supporting sleeves and adjacent parts, enlarged.

Fig. 4 is a section in a plane transverse the steering cross-arm, showing certain details.

Referring first to Fig. 1, F, F are side members of a representative vehicle frame, and R is the connecting link, or cross-rod of the vehicle steering mechanism, which connects the front wheels of the car and moves with them in steering.

Sleeves 1 support the movable head-light brackets 2. Each sleeve is provided with flanges 3, 4, which are bolted to the top flanges and webs, respectively, of the frame members F. Each bracket 2 is carried by a stem 5 which passes through the sleeve 1. Between the sleeve and the stem is placed a bearing bushing 6, of bronze or other suitable bearing material, and this bushing is replaceable for wear. On the stem 5 is placed a cap 7, secured to the stem by a set-screw 8, or otherwise, and this cap overlies the top of sleeve 1, and also has an annular flange 9 overlapping the upper end of the sleeve for a short distance. The cap 7, with its flange 9 overlapping the sleeve serves to support the stem 5 in the sleeve, to permit vertical adjustment of the stem, and to exclude water and dirt from the bearing. If desired, a grease- or oil-cup 10 may be attached to the sleeve, to deliver oil or grease to the bearing through suitable passages.

At the bottom of sleeve 1 an arm 11 is connected to stem 5 by means of a split hub 12, and bolt 13 connecting the free sides of the hub. The upper face of the hub engages the bottoms of the sleeve 1 and bushing 6, and serves to retain the bushing and also to prevent upward displacement of the stem 5 in respect to the sleeve. By loosening the bolt 13, the angle of arm 11 with respect to stem 5 may be changed, and the angular position of the bracket and the head-light carried by it thus altered for different steering positions.

For connecting the arms 11 of the two brackets with the cross-rod R, to cause the head-lamps to swing laterally in accordance with the steering movement of the vehicle wheels, the cross-rod has adjustably attached to it, usually at the middle, a center connecting-member 14 comprising upper and lower halves 15. Each of these halves has part-round portions to fit the rod, and each has an ear 16 at one side, and these ears are provided with registering holes to receive a clamping bolt 17. At the other side of each member 15 is a flange 18 and these flanges are provided with two sets of registering holes 19 to receive bolts 20, which in a preferred construction also constitute pivot connections, as will appear. By placing the halves 15 above and below the rod, and inserting and tightening bolts 17 and 20, the center connecting member is secured in the proper position upon the rod.

The bolts 20 have flanges 21 to engage the upper flange 18 of the center connecting member, and at the upper end each bolt has a ball 22. The outer end of each of the stem-arms 11 is formed with an eye, in which is secured a connecting member 23, which may be identical with the bolts 20 previously described, for the sake of simplicity and economy in construction.

Each of the brackets is operatively connected with the center connecting member 14 by a link 24. At each end each of these links has a head 25 provided with a ball socket to engage the ball 22, formed at the end of bolt 20, or the bolt 23, respectively. These links are suitably curved to avoid obstacles while permitting the necessary range of movement of the head-lights, to correspond with the steering movement of the wheels. In a preferred construction, adjustment means is provided for the links, which consists, in the present embodiment, in making the links in two pieces, and connecting these parts by adjustment devices 26, of the turn-buckle type.

The foregoing construction provides for all adjustments in an easy fashion. An especial advantage of the ball-connecting devices for the links 24 is that connections such as shown readily adapt themselves to different relative vertical positions of the arms 11 and the cross-rod R, which may be found in different vehicles. In Fig. 1, the cross-rod is shown, as a matter of convenience at substantially the same level as the arms 11; but in practice this will not usually be the case; and evidently the connecting devices used will adapt themselves to any difference in level between the cross-rod and the arms 11, within reasonable limits, and at the same time the movement of the parts in steering will not be interfered with.

I claim:

The combination with the frame, of a fixed sleeve, an elongated bushing in the sleeve extending its full length and having its ends flush with the ends of the sleeve, a lamp-bracket-stem oscillatable in the bushing, a cap fixed on the stem and supported on the upper ends of the sleeve and bushing, an actuating arm having a split hub on the lower end of the stem engaging the lower ends of the sleeve and bushing, and a clamp bolt in the free sides of the hub for rigidly securing the arm to said stem.

MACK O. MEEKS.